Dec. 5, 1933.                    W. H. CREW                    1,938,136
                            VACUUM TUBE ELECTROMETER
                    Filed Jan. 26, 1929          2 Sheets-Sheet 1

INVENTOR.
William H. Crew,
BY Harold Dodd.
ATTORNEY.

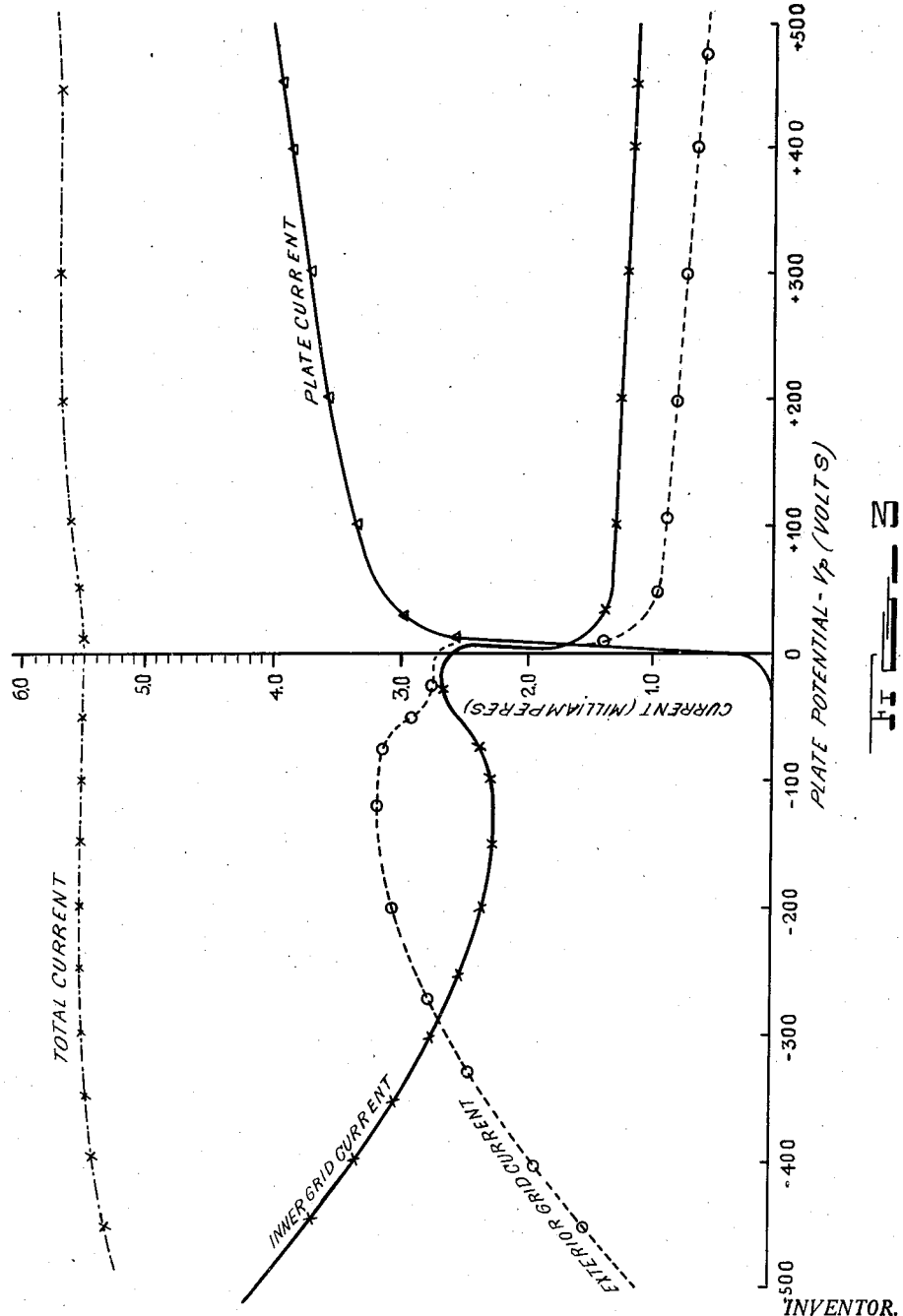

Patented Dec. 5, 1933

1,938,136

UNITED STATES PATENT OFFICE 1,938,136

VACUUM TUBE ELECTROMETER

William Henry Crew, Annapolis, Md.

Application January 26, 1929. Serial No. 335,378

4 Claims. (Cl. 175—183)

My invention relates broadly to electric potential measuring devices and more specifically to vacuum tube electrometers.

One of the objects of my invention is to provide an electron discharge device circuit arrangement which is adapted to measure high electrical potentials.

Another object of my invention is to provide an electron discharge device circuit arrangement which is adapted to measure high electrical potentials and in which the potential to be measured is connected to electrodes other than the grid electrodes and the capacity effects of the electron discharge device circuit maintained at a minimum.

Still another object of my invention is to provide an electron discharge device circuit arrangement adapted for measuring the magnitude of electrical potential difference in which the potential difference to be measured is introduced into the plate circuit of the electron discharge device and a measuring instrument connected in the grid circuit of the device.

A further object of my invention is to provide a circuit arrangement employing a four electrode electron discharge device which is adapted to measure high electrical potentials applied to the plate circuit by means of an indicating meter connected in one of the grid circuits of the device.

A still further object of my invention is to provide a circuit arrangement employing a four electrode electron discharge device for measurement of electrical potentials in which the plate electrode is used as the control electrode and in which the plate electrode is substantially electrically isolated from the other electrodes in the electron discharge device.

Figure 1:
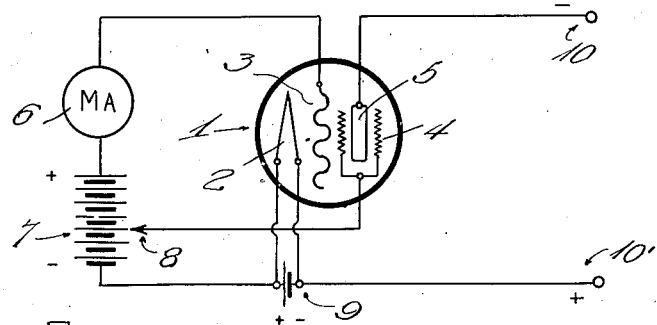
Figure 2:
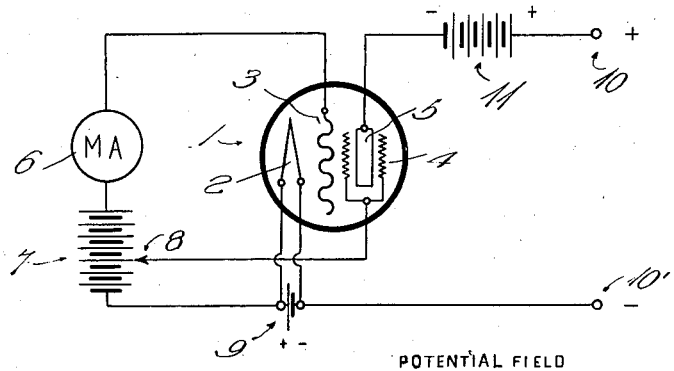
Figure 4:
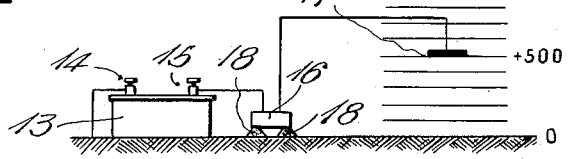
Figure 5:
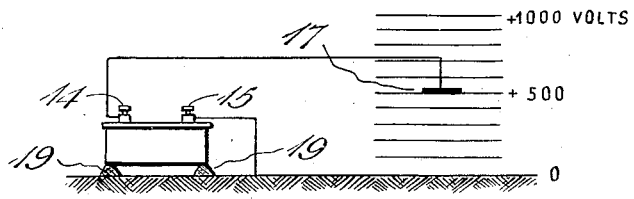

Other objects and features of my invention will be understood from the following specification by reference to the accompanying drawings, in which:

Figure 1 illustrates a circuit arrangement embodying my invention; Fig. 2 illustrates a modified form of my invention; Fig. 3 shows a set of current and plate voltage characteristic curves illustrating the operation of the arrangement shown in Fig. 1; and Figs. 4 and 5 illustrate arrangements incorporating this invention for measuring atmospheric potential fields.

Referring to Fig. 1 of the drawings in detail, the reference numeral 1 designates an electron discharge device having cathode 2, grid electrodes 3 and 4 and anode 5. Electron discharge device 1 may be of the shield grid four electrode type. Current indicating device 6 which may be a milliammeter or similar device is connected to grid electrode 3 and to the positive terminal of the source 7.

The electrode 4 is connected to the source 7 through the connection 8. The electrode 4 is maintained at a negative potential with respect to the electrode 3 and at a positive potential with respect to the cathode 2. The source of current supply 9 is connected to the filament 2. The filament 2 and the anode 5 are connected to the terminals 10 and 10'. The points whose potential difference is to be determined are connected to the terminals 10 and 10' in such a manner that the anode of the electron discharge device is given a negative charge with respect to the cathode.

In Fig. 2 is illustrated a modified form of this invention in which the negative terminal of a source of current supply 11 is connected to the anode 5. The positive electrode of the source is connected to the terminal 10. The positive electrode of the source 11 may be connected directly to the filament in which case the negative terminal is not connected to the anode but to the terminal 10'. By employing the source 11 the anode potential is maintained at a high negative value and the arrangement may be more readily used to measure potentials of the field of the atmosphere which normally in fair weather is positive with respect to the earth.

The operation of the circuit arrangement illustrated in Fig. 1 is best understood from a reference to the characteristic curves illustrated in Fig. 3. These curves were obtained using a low powered four electrode electron discharge device with the inner grid electrode 3 at a potential of +20 volts and the exterior grid electrode 4 at a potential of +3 volts with respect to the cathode.

Electrons are given off by the filament and are caused to travel to the grid electrodes. Because of the high velocity that these electrons attain on account of the accelerating influence of the positively charged grid electrodes they force a secondary electron emission from the inner grid electrode and the exterior grid electrode. The inner grid electrode is maintained at a relatively high positive potential consequently the major part of the secondary electron emission emitted by it is deflected back to it. The exterior grid electrode is at a negative potential with respect to the inner grid electrode, therefore the secondary emission from it is accelerated to the inner grid electrode. The observed current in the inner grid circuit is therefore the sum of the electron current coming to it from the cathode and the secondary emission of the exterior grid electrode. The current in the exterior grid circuit is the net result of the electron stream which is emitted from the filament and is carried past the inner grid electrode to the exterior grid electrode, and of the electrons lost through the secondary emission of the exterior grid electrode. Therefore as the potential difference between the anode and the cathode is changed from −40 to −100 volts and the electron current reaching the exterior grid electrode is reduced, the secondary emission from the exterior grid electrode is reduced. An increase in the exterior grid electrode current and a decrease in the inner grid electrode current results. When the potential difference between the anode and the cathode reaches −100 volts the secondary emission from the exterior grid electrode is zero under the conditions under which the data for the curves of Fig. 3 were obtained and further increase of the negative plate voltage deflects more and more electrons away from the exterior grid electrode back to the inner grid electrode and the inner grid current increases as is shown by the grid current curves.

The inner grid electrode current curve is seen to be practically a linear function of the negative plate potential in the region from −200 volts to −500 volts. Other portions of the inner grid electrode current curve may be caused to be substantially linear functions of the negative plate potential. The voltage range over which the current registered by the milliammeter 6 is approximately proportional to the magnitude of the negative potential applied to the plate electrode of the electron discharge device electrometer may be varied by varying the exterior grid potential, the inner grid potential, the cathode current, or alterating the mesh of the grid electrodes and the position and size of the electrodes. Increasing applied potentials are registered as increasing grid currents and not as decreasing grid currents, and there is no current flow in the plate circuit, which are substantial advantages of my invention over devices of this type heretofore known.

Referring to Figs. 4 and 5 arrangements are shown wherein the electron discharge device electrometer herein disclosed is used for measuring the electric potential gradient of the earth's atmosphere. A well insulated radio active collector 17 is suspended at a known height above the earth. The source of supply 16 mounted upon the insulators 18 is connected between the collector 17 and a terminal 15 of the electrometer 13. The terminal 14 is connected to the earth. The source of supply 16 is connected to the anode of the electron discharge device as shown in Fig. 2 for maintaining the anode at a negative potential with respect to the filament in order that the electrometer may be employed to measure positive potentials.

The source may, however, be dispensed with by supporting the electrometer on insulators 19 as illustrated in Fig. 5, in which case the collector 17 is connected to the terminal 14 which is connected to the cathode of the electron discharge device. The terminal 15 which is connected to the anode of the electron discharge device is connected to the earth in the arrangement shown in Fig. 5.

Having thus described my invention in some of its preferred embodiments, I desire that it be understood that various modifications of this invention may be made and that no limitations upon the invention are intended other than are imposed by the scope of the annexed claims.

What I claim as new and desire to secure by Letters Patent of the United States is as follows:

1. In a system for measuring potentials of small quantities of electricity which are positive with respect to ground, an electron tube having cathode, plate, inner grid and outer grid, terminals for connection with a source of potential to be measured which is positive with respect to ground, means including a source of direct current for positively biasing said inner grid with respect to said cathode and likewise for less positively biasing said outer grid, a current measuring instrument in circuit with said inner grid, and a source of direct current plate potential having its negative terminal connected to said plate, the positive terminal for connection to said source of potential to be measured being connected to the positive terminal of said source of plate potential.

2. In a device of the class described, an electron tube having a cathode, a plate, an inner grid and a shield grid, a current measuring instrument in circuit with said inner grid, means including a source of direct current for positively biasing said grids with respect to said cathode, the inner grid being more positive than the shield grid, and means including a source of potential to be measured for applying an effectively negative potential to said plate with respect to said cathode, whereby the intra-grid currents are controlled and said measuring instrument is caused to indicate an inner grid current flow which is a function of the potential difference between said plate and said cathode.

3. A device in accordance with claim 2 in which said electron tube is provided with electrode terminals and the potential to be measured is applied across the plate and cathode terminals in opposition to a source of direct current of known value.

4. In the measurement of differences in potential across an atmospheric or quasi-electrostatic field the method of employment of an electron tube having a plate, a cathode, an inner grid and a shielding grid, and having a current measuring instrument and a source of biasing potential in an external circuit between said cathode and said inner grid so as to positively bias the latter, which comprises applying the potential difference to be measured externally between said plate and said cathode, rendering said plate negative with respect to said cathode so as to control the intra-grid space currents of said tube, applying a potential to said shielding grid which is negative with respect to said inner grid and positive with respect to said cathode, and measuring the inner grid current in terms bearing a known relation to the value of the applied potential to be measured.

WILLIAM HENRY CREW.